Feb. 14, 1928.
G. J. PHILIPPI
1,659,156
RESILIENT WHEEL
Original Filed April 22, 1924
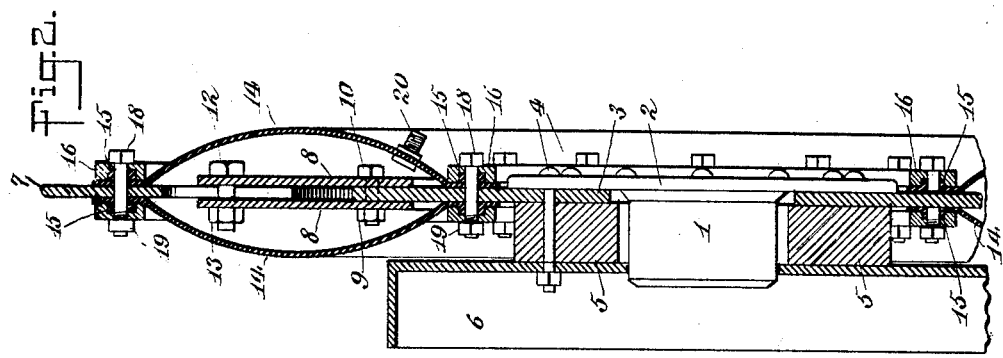
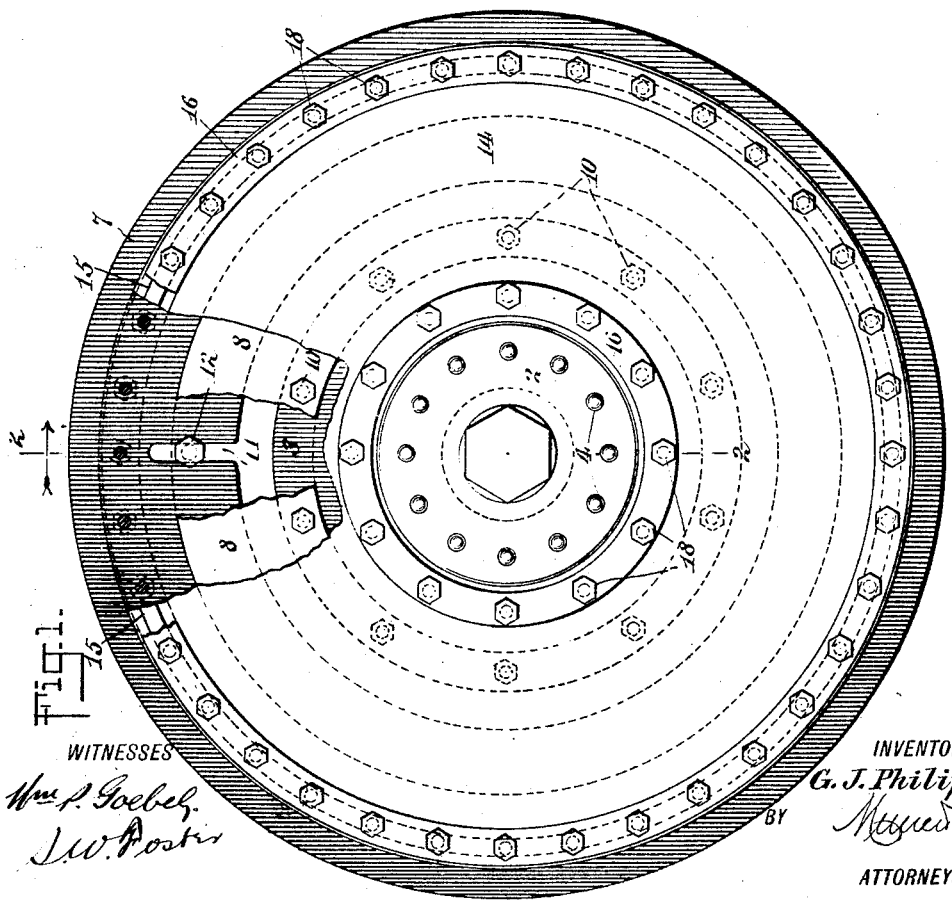
WITNESSES
INVENTOR
G. J. Philippi.
BY
ATTORNEYS Patented Feb. 14, 1928.

1,659,156

UNITED STATES PATENT OFFICE.

GEORGE J. PHILIPPI, OF BROOKLYN, NEW YORK.

RESILIENT WHEEL.

Application filed April 22, 1924, Serial No. 708,258. Renewed April 27, 1927.

This invention relates to resilient wheels and more particularly to a wheel of this character designed for use on automobiles and the like which will give the necessary cushion or resilience to the vehicle, and which will permit the use of solid or other tires so as to overcome the annoyance of punctures, blow-outs and the like, which are common in the employment of ordinary wheels and tires, such as now in common use.

A further object is to provide a wheel of this character in which an annular air cushion is provided between the hub disk and the felly to sustain the shocks and jars of the vehicle as the wheels move over the ground, and which is so constructed as to embody the maximum of strength and durability to withstand the strains and stresses to which a wheel of this character is necessarily subjected.

With these and other objects in view, the invention consists in certain novel features of construction and combinations and arrangements of parts which will be more fully hereinafter described and pointed out in the claim.

In the accompanying drawings—

Figure 1 is a view in side elevation, partly broken away, illustrating my improved wheel;

Figure 2 is a view in transverse section on the line 2—2 of Figure 1.

1 represents a wheel hub having a flange 2 thereon which is rigidly secured to a circular disk 3 by means of bolts or other securing means 4. These bolts 4 may also be utilized for securing a ring 5 and brake drum 6 to the wheel hub. Where the wheel is not employed as a brake wheel the drum is eliminated.

For convenience of description, I shall hereinafter refer to the disk 3 as the "hub disk." Around this hub disk and spaced therefrom an annular felly 7 is located. This felly 7 is of the same thickness as the disk and is preferably of steel as is also the disk.

To opposite sides of the disk 3 I secure flat ring members 8, 8. These members may of course be secured in various ways but I have illustrated bolts 10 projecting through the members 8 and through the disk 3 and secured by nuts 9. These members 8, 8 are of sufficient width to overlap the felly 7, and said felly is provided with a radial slot or recess 11 through which a coupling bolt 12 is projected. This bolt 12 passes through both of the members 8, 8 and is secured in place by a nut 13. It will thus be noted that by reason of this coupling bolt the felly is coupled to the members 8, 8 and as the latter are secured to the hub disk 3 the parts are compelled to turn together yet are permitted the desired independent radial movement to cushion the wheel as will more fully hereinafter appear.

To the hub disk 3 and the felly 7 and at opposite sides thereof I secure annular outwardly curved flexible and more or less resilient air casing members 14, 14. These air casing members 14, 14 are preferably formed with circular beads 15 adjacent their respective edges which snugly fit within grooved metal rings 16, and bolts 18 are projected through these rings 16, through the beads 15, and through the felly and disk respectively, and secured by nuts 19, so as to effectually clamp the resilient air casing members 14 and maintain the juncture airtight so that an air chamber is formed within the rings 14, 14, and air may be forced therein through a suitable valve 20 to give the necessary inflation and air cushion.

It is, of course, to be understood that any suitable form of rim and tire (not shown) may be employed at the outer edge of the felly and it is obvious that such a tire may be solid as the cushion and resilience of the wheel is sufficient for all purposes and relieves the necessity of employing the ordinary pneumatic tires.

It will be noted that by reason of the construction above described the parts may be readily assembled or taken apart, worn or broken parts replaced, and hence the original cost and the cost of repairs is reduced to a minimum.

Furthermore, by reason of such a construction I attain the maximum of strength yet permit the necessary cushioning and resiliency and provide a wheel which can be manufactured and sold at a reasonably low price and which will not be too heavy for practical use.

Various slight changes and alterations might be made in the general form of the parts described without departing from my invention, and hence I do not limit myself to the precise details set forth but consider myself at liberty to make such slight changes and alterations as fairly fall within the spirit and scope of the appended claim.

I claim:

A resilient wheel, comprising a hub disk, an annular felly spaced therefrom, a flexible annular air casing, located between the felly and the disk and secured to both, annular members fixed to the disk within the air casing and receiving the felly therebetween, said felly having a single radial slot within the air casing, and a bolt carried by said annular members and projected through said slot.

GEORGE J. PHILIPPI.